United States Patent [19]

Menovcik et al.

[11] Patent Number: 5,827,931
[45] Date of Patent: *Oct. 27, 1998

[54] POLYURETHANE POLYMER OR OLIGOMER HAVING CARBAMATE GROUPS, METHOD FOR ITS PREPARATION, AND COATING COMPOSITION

[75] Inventors: Gregory L. Menovcik, Farmington Hills; Walter H. Ohrbom, Commerce, both of Mich.

[73] Assignee: BASF Corporation, Southfield, Mich.

[ * ] Notice: The term of this patent shall not extend beyond the expiration date of Pat. No. 5,732,552.

[21] Appl. No.: 950,950

[22] Filed: Oct. 15, 1997

Related U.S. Application Data

[60] Continuation of Ser. No. 547,174, Oct. 24, 1995, Pat. No. 5,723,552, which is a division of Ser. No. 361,344, Dec. 21, 1994, abandoned.

[51] Int. Cl.[6] ..................................................... C08G 18/28
[52] U.S. Cl. ........................... 525/453; 525/456; 525/460
[58] Field of Search ...................................... 525/453, 456, 525/460

[56] References Cited

U.S. PATENT DOCUMENTS

| | | | |
|---|---|---|---|
| 4,177,342 | 12/1979 | Bock et al. | 528/45 |
| 5,093,456 | 3/1992 | Mitra et al. | 528/73 |
| 5,373,069 | 12/1994 | Rehfuss | 525/456 |
| 5,723,552 | 3/1998 | Menovcik et al. | 525/453 |

*Primary Examiner*—Rachel Gorr
*Attorney, Agent, or Firm*—Anne Gerry Sabourin

[57] ABSTRACT

Polyurethane polymers having pendant carbamate groups are disclosed. The polymers are prepared by:

(a) reacting a mixture comprising a polyol having at least one pendant carbamate group and a polyisocyanate to form a polyurethane having pendant carbamate groups, and (b) optionally, capping the polyurethane from (b) with an active hydrogen-containing capping agent.

22 Claims, No Drawings

POLYURETHANE POLYMER OR OLIGOMER HAVING CARBAMATE GROUPS, METHOD FOR ITS PREPARATION, AND COATING COMPOSITION

This is a continuation of U.S. patent application Ser. No. 08/547,174, filed Oct. 24, 1995, now U.S. Pat. No. 5,723,552, which is a divisional of U.S. patent application Ser. No. 08/361,344, filed Dec. 21, 1994, now abandoned.

FIELD OF THE INVENTION

This invention relates to polymers, and in particular to curable coating compositions that contain polymers.

BACKGROUND OF THE INVENTION

Polymers and oligomers having carbamate functional groups have been used in a variety of curable compositions. Carbamate-functional acrylic polymers are described, for example, in U.S. Pat. No. 5,356,669 and WO 94/10211. These can be prepared by addition polymerization of carbamate-functional acrylic monomers or by transcarbamylation of a hydroxy functional acrylic with an alkyl carbamate. Carbamate-functional polyesters, prepared by transcarbamylation of a hydroxy-functional polyester, are described in JP 51/4124.

Polyurethane resins are also widely used in curable compositions such as coating compositions. These resins offer many beneficial properties, such as good durability, good dispersibility in aqueous systems through incorporation of appropriate ionic or nonionic stabilizing groups, impact resistance, good adhesion, and other physical properties such as stress release. One area of concern with polyurethane resins for curable compositions has been the incorporation into the resin of sufficient levels of functional groups to achieve the desired cure performance. Hydroxyl groups are commonly used as functional groups in curable compositions, but polyurethane resins with pendant hydroxyl groups are difficult to prepare since any pendant hydroxyl groups would be consumed by reaction with isocyanate during formation of the polyurethane. Hydroxyl functional groups are usually incorporated onto polyurethane resins by the use of polyol capping agents like trimethylol propane resulting in terminal OH groups, but no pendant OH groups. Such resins provide only limited crosslink density upon cure. The crosslink density may be increased somewhat by using branched polyurethanes, which are prepared by the incorporation of trifunctional or higher functional polyols in the polyurethane reaction mixture. However, the degree of branching is often limited due to gelation. Low crosslink density must often be compensated for by using higher molecular weight resins that more closely resemble thermoplastic compositions than thermoset compositions.

Carbamate-functional polyurethanes are described in U.S. Pat. No. 5,373,069. This reference describes the preparation of polyurethanes having carbamate terminal groups by a variety of schemes, such as capping an isocyanate-terminated polyurethane with a hydroxyalkyl carbamate. The reference also discloses the preparation of polyurethanes having pendant carbamate groups by first preparing a polyurethane having pendant acid groups by known techniques, and then transesterifying the acid groups with a hydroxyalkyl carbamate. This approach involves a synthetic route that can be difficult. Moreover, it results in consumption of acid groups on the polyurethane, which are not then available for aqueous stabilization of the resin.

Accordingly, the present invention is directed toward a new method of preparing polyurethane polymers or oligomers having pendant carbamate groups. It is also directed to a polyurethane resin having both pendant carbamate groups and acid groups.

SUMMARY OF THE INVENTION

According to the present invention, a method of preparing a polyurethane polymer or oligomer is provided comprising:

(a) reacting a mixture comprising a polyol having at least one pendant carbamate group and a polyisocyanate to form a polyurethane having pendant carbamate groups, and (b) optionally, capping the polyurethane from (b) with an active hydrogen-containing capping agent.

Another embodiment of the present invention is directed to a polyurethane polymer or oligomer having both acid groups and carbamate groups.

In another embodiment of the invention, there are provided curable coating compositions comprising the above-described carbamate-functional polyurethanes and a curing agent that is reactive with carbamate.

DESCRIPTION OF THE PREFERRED EMBODIMENTS

The polyol having at least one carbamate group appended thereto can be prepared in a variety of ways. One method is to react a compound having a plurality of cyclic carbonate groups with ammonia, ammonium hydroxide, or a primary amine to ring open the cyclic carbonate groups. This ring-opening reaction converts each cyclic carbonate ring to a hydroxyl group and a pendant carbamate group.

The compound having a plurality of cyclic carbonate groups can be prepared in several ways. One technique is to react a polyisocyanate or a polyanhydride with a hydroxyalkyl cyclic carbonate. Hydroxyalkyl cyclic carbonates can be prepared by a number of approaches. Certain hydroxyalkyl cyclic carbonates like 3-hydroxypropyl carbonate (i.e., glycerine carbonate) are commercially available. Cyclic carbonate compounds can be synthesized by any of several different approaches. One approach involves reacting an epoxy group-containing compound with $CO_2$, preferably under pressure with a catalyst. Useful catalysts include any that activate an oxirane ring, such as tertiary amine quaternay salts (e.g., tetramethyl ammonium bromide), tin and/or phosphorous complex salts (e.g., $(CH_3)_3SNI$, $(CH_3)_4PI$). Epoxides can also be reacted with β-bytyrolactone in the presence of such catalysts. In another approach, a glycol like glycerine is reacted at temperatures of at least 80° C. (usually under reflux) with diethyl carbonate in the presence of a catalyst (e.g., potassium carbonate) to form a hydroxyalkyl carbonate. Alternatively, a functional compound containing a ketal of a 1,2-diol having the structure:

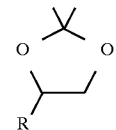

can be ring-opened with water at temperatures of at least 60° C., preferably with a trace amount of acid, to form a 1,2-glycol, which is then further reacted with diethyl carbonate to form the cyclic carbonate.

Cyclic carbonates typically have 5–6-membered rings, as is known in the art. Five-membered rings are preferred, due to their ease of synthesis and greater degree of commercial availability. Preferred hydroxyalkyl cyclic carbonates used in the practice can be represented by the formula:

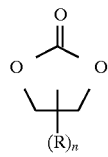

where R is a hydroxyalkyl group of 1–18 carbon atoms, preferably 1–6 carbon atoms, and more preferably 1–3 carbon atoms, and n is 1 or 2, which may be substituted by one or more other substituents such as blocked amines or unsaturated groups. More preferably, R is —$C_mH_{2m}$OH where the hydroxyl may be primary or secondary and m is 1 to 8, and even more preferably, R is —$(CH_2)_p$—OH where the hydroxyl is primary and p is 1 to 2.

The organic polyisocyanate that can be reacted with the hydroxyalkyl cyclic carbonate is essentially any polyisocyanate and is preferably a diisocyanate, e.g., hydrocarbon diisocyanates or substituted hydrocarbon diisocyanates. Many such organic diisocyanates are known in the art, including p-phenylene diisocyanate, biphenyl 4,4'diisocyanate, toluene diisocyanate, 3,3'-dimethyl-4,4 biphenylene diisocyanate, 1,4-tetramethylene diisocyanate, 1,6-hexamethylene diisocyanate, 2,2,4-trimethylhexane-1,6 diisocyanate, methylene bis (phenyl isocyanate), 1,5 naphthalene diisocyanate, bis (isocyanatoethyl fumarate), isophorone diisocyanate (IPDI), tetramethylxylene diisocyanate, and methylene-bis- (4 cyclohexylisocyanate). There can also be employed isocyanate-terminated adducts of diols, such as ethylene glycol, or 1,4-butylene glycol, etc. These are formed by reacting more than one mole of a diisocyanate, such as those mentioned, with one mole of a diol to form a longer chain diisocyanate. Alternatively, the diol can be added along with the diisocyanate.

While diisocyanates are preferred, other multi-functional isocyanates may be utilized. Examples are 1,2,4-benzene triisocyanate and polymethylene polyphenyl isocyanate.

The polyisocyanate and hydroxyalkyl cyclic carbonate reaction can be performed under conditions known in the art for the reaction of alcohols and isocyanates.

Polyanhydrides that can be reacted with a hydroxyalkyl cyclic carbonate include any of a number of compounds well-known in the art, e.g., hexahydrophthalic anhydride, methyl hexahydrophthalic anhydride, maleic anhydride, glutamic anhydride, 1,2,4,5-bis-anhydride cyclohexane. The conditions for this reaction are generally at least 80° C., preferably 98°–120° C., in the presence of a tin metal catalyst.

Compounds having a plurality of cyclic carbonate groups can also be readily prepared by reaction of a polyepoxide with carbon dioxide to convert the epoxy groups to cyclic carbonate groups. Polyepoxides are well-known in the art. Useful polyepoxides include the trimethylol propane that has been epoxidized by reaction with an epihalohydrin, and also epoxy-novolacs. Oligomeric or polymeric polyepoxides, such as acrylic polymers or oligomers containing glycidyl methacrylate or epoxy-terminated polyglycidyl ethers, can also be used. Other polyepoxides, e.g., epoxy-novolacs, may also be used. As with other polyepoxides, epoxy-novolacs can be reacted with carbon dioxide to form the cyclic carbonate compound.

Although linear polyurethanes will be based primarily on compounds having two functional groups for the urethane reaction, cyclic carbonates with a functionality higher than 3 are also contemplated to provide branched polyurethanes. For example, the isocyanate groups on a diisocyanate such as isophorone diisocyanate may be adducted with a polyol such as trimethylol propane to produce a tetrafunctional alcohol, which can be epoxidized with an epihalohydrin to produce a tetrafunctional polyepoxide, which is in turn reacted with carbon dioxide to form a tetrafunctional cyclic carbonate. Other higher-functionality polyepoxides, e.g., tetrakis(4-glycidyloxy-phenyl)ethane, may also be reacted with $CO_2$ to form poly-cyclic carbonates.

The compound having a plurality of cyclic carbonate groups is reacted with ammonia, ammonium hydroxide, or a primary amine. This reaction is performed under mild conditions (e.g., 0°–60° C. in water, methanol, or other known solvents. Reaction with ammonia or ammonium hydroxide yields a primary carbamate, and is preferred. Reaction with a primary amine yields a secondary (N-substituted) carbamate. The ring-opening reaction of ammonia, ammonium hydroxide, or a primary amine with the cyclic carbonate group yields a carbamate group as described above and also a primary or secondary hydroxyl group, which takes part in the polyurethane-forming reaction in the next step of the invention. This reaction product thus comprises pendant carbamate groups, and terminal hydroxyl groups.

Another technique to prepare a polyol having at least one pendant carbamate group appended thereto is to react a hydroxyalkyl cyclic carbonate with ammonia, ammonium hydroxide, or a primary amine. This reaction is performed as described above with respect to the ring opening of the compound having plurality of cyclic carbonate groups. The resulting compound has two hydroxyl groups and one pendant carbamate group.

The pendant carbamate groups on the polyurethane of the present invention can be primary or secondary groups. Primary carbamate groups can be represented by the formula:

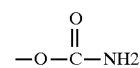

and secondary carbamate groups can be represented by the formula:

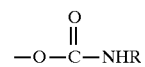

where R is substituted or unsubstituted alkyl of 1–8 carbon atoms, preferably 1–4 carbon atoms, and more preferably 1 carbon atom, or cycloaliphatic. It is to be understood that the terms alkyl and cycloalkyl are to include substituted alkyl and cycloalkyl, such as halogen-substituted alkyl or cycloalkyl or unsaturated group-substituted alkyl. Substituents that will have an adverse impact on the properties of the cured material, however, are to be avoided. Primary carbamates are formed in the above-described ring-opening reactions of cyclic carbonates through the use of ammonia or ammonium hydroxide as the ring-opening reactant.

In step (b) of the present invention, a mixture comprising the reaction product of step (a) and a polyisocyanate is reacted to form a polyurethane. This mixture may also comprise additional components used in the preparation of polyurethanes, such as other monomeric, polyols, fatty polyols, or oligomeric or polymeric polyols, additional polyisocyanates, polyisocyanate prepolymers, polyamines, amino alcohols, triisocyanurates, and the like. The above components may be reacted in the same pot, or may be reacted sequentially, depending upon the desired results. Sequential reaction produces resins which are more ordered in structure. The reaction product of step (a) and the other above-described compounds with active hydrogen groups may serve as chain extenders to build up the polyurethane backbone through reaction of active hydrogen groups with isocyanate groups if they have more than one active hydrogen group. Where the multi-functional compound has only one active hydrogen group, the result is chain termination. Additional chain extenders having at least two active hydrogen groups may be added to increase the chain length or to change the chemical characteristics of the polyurethane resin.

The polyurethane reaction is conducted under conditions well-known in the art, typically below 100° C. in a protic solvent (e.g., aromatics, esters, ketones) in the presence of a tin catalyst. The resulting polyurethane resin has a number average molecular weight of from 1000 to 40,000.

In general, an excess of polyisocyanate is used so that an intermediate polyurethane resin can be produced having free isocyanate groups at the terminal ends. The free isocyanate groups may then be capped with known capping agents for isocyanates.

Isocyanates useful in step (b) of the invention can be any of the isocyanates described above with regard to preparation of the compound having a plurality of cyclic carbonate groups, individually or in combination.

It is often preferred to employ an aliphatic diisocyanate, since it has been found that these can provide improved weatherability of the finished coating. Examples include 1,6-hexamethylene diisocyanate, 1,4-butylene diisocyanate, methylene bis (4-cyclohexyl isocyanate) and isophorone diisocyanate. Mixtures of diisocyanates can also be employed.

The proportions of the polyisocyanate, the reaction product of step (a), and any other active hydrogen-containing compounds may be chosen so as to provide an active hydrogen-terminated polyurethane resin or an isocyanate-terminated intermediate polyurethane resin. This can be accomplished by utilizing a stoichiometric excess of active hydrogen compound or of polyisocyanate.

If water-solubility is desired, it is important to build water-stabilizing groups into the polyurethane. Such groups can be anionic acid groups (e.g., carboxyl groups) or nonionic groups (e.g., polyethers). For example, the presence of acid groups is capable of rendering the composition water-dilutable when neutralized.

The acids that are employed to provide free acid groups in the polyurethane resins of this invention are readily available. They contain at least one active hydrogen group and at least one carboxylic acid functionality. The active hydrogen group may be a thiol, a hydroxyl or an amine, with primary amines being considered to have one active hydrogen group. Examples of such compounds include hydroxyl carboxylic acids, amino acids, thiol acids, aminothiol acids, alkanolamino acids, and hydroxythiol acids.

Compounds containing at least 2 hydroxyl groups and at least one carboxylic acid are preferred. They can be prepared from an aldehyde that contains at least two hydrogens in the alpha position. Such aldehydes are reacted in the presence of a base catalyst with two equivalents of formaldehyde to form a 2,2-dihydroxymethyl aldehyde. The aldehyde is then gently oxidized to the acid by known procedures. The acids that are employed in the invention can be represented in simplification by Formula I:

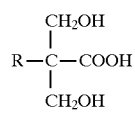

wherein R represents hydroxymethyl, hydrogen, or alkyl of up to 20 carbon atoms and preferably up to 8 carbon atoms.

Specific illustrative examples of such acids that are employed in the invention include 2,2-di(hydroxymethyl) acetic acid, 2,2,2-tri(hydroxymethyl) acetic acid, 2,2-di (hydroxymethyl) propionic acid, 2,2-di (hydroxymethyl) butyric acid, 2,2-di(hydroxymehtyl) pentanoic acid, and the like. The preferred acid is 2,2-di(hydroxymethyl) propionic acid.

The polyethers that may be utilized to nonionically impart water-solubility to the polymer are known in the art, and are described, for example, in U.S. Pat. No. 4,794,147, the disclosure of which is incorporated herein by reference. Useful polyether compounds are preferably mono or difunctional polyethers with mono-functional polyethers being preferred. The functional groups on the polyethers may be alcohol groups, thiols, amines, or mixtures of these functionalities. The monofunctional polyethers may be formed from monoalcohol-initiated polymerization of ethylene oxide, propylene oxide, and mixtures thereof. A polyether compound comprised of 100% ethylene oxide units is especially preferred. When a polyether group is used as the water-stabilizing group, it preferably comprises between 5 and 25% by weight of the final polyurethane resin and has a molecular weight of from 1000 to 3000.

Longer-chain polyurethane resins can be obtained by chain extending the polyurethane chain with a compound or mixture of compounds containing at least two active hydrogen groups but having no carboxylic acid group, for example diols, dithiols, diamines, or compounds having a mixture of hydroxyl, thiol, and amine groups, for example, alkanolamines, aminoalkyl mercaptans, and hydroxyalkyl mercaptans, among others. For purposes of this aspect of the invention both primary and secondary amine groups are considered as having one active hydrogen. Alkanolamines, for example, ethanolamine or diethanolamine, are preferably used as chain extenders, and most preferably, a diol is used. Examples of preferred dials which are used as polyurethane chain extenders include 1,6 hexanediol, cyclohexanedimethylol, and 1,4-butanediol. While polyhydroxy compounds containing at least three hydroxyl groups may be used as chain extenders, the use of these compounds produces branched polyurethane resins. For purposes of the present invention, it is preferred to minimize the amount of branching in the polyurethane resin. Therefore, if polyhydroxy compounds are used, they are preferably limited to a minor component of the polyurethane producing mixture. These higher functional polyhydroxy compounds include, for example, trimethylolpropane, trimethylolethane, pentaerythritol, among other compounds.

The polyurethane resin may be chain extended in any manner using multifunctional compounds having at least two active hydrogen groups. Thus, these compounds may be added to the mixture of polyisocyanate, carbamate-containing polyol, and multi-functional compound, or alternatively, may react at an intermediate stage, to link two free isocyanate groups that are present at the terminal ends of an intermediate polyurethane resin.

An intermediate polyurethane resin thus produced may be terminated with free isocyanate groups. To accomplish this, an excess of the polyisocyanate component is used. Of course, the molar ratio of the other components will be adjusted according to the desired characteristics of the intermediate and final polyurethane resins. The polyol component should comprise no more than about 45% by weight of the reaction mixture and it is preferred that the polyol component comprises from about 30% to about 40% by weight of reactants in the mixture.

In one preferred embodiment of the invention, a mono- or multi-functional alcohol is used to terminate the reaction (cap the free isocyanate groups) at the desired stage (determined by the viscosity and concentration of isocyanate groups present). Particularly desirable for such purposes are aminoalcohols, such as ethanolamine, diethanolamine and the like, since the amino groups preferentially react with the isocyanate groups present. Multi-functional alcohols, such as ethylene glycol, trimethylolpropane and hydroxyl-terminated polyesters, can also be employed in this manner. If a resin with only carbamate functionality and no hydroxyl functionality, the intermediate polyurethane resin is preferably capped with a monofunctional alcohol or amine (e.g., n-butanol).

The amount of polyisocyanate used in the mixture is preferably between about 20% and 30% by weight of the reactants in the mixture, but will vary depending upon the presence and amounts of other polyols, the desired acid number of the final polyurethane resin (if anionic water stabilizing groups are used), and the desired molecular weight of the final polyurethane resin, as well as other factors known in the art. The amount of polyisocyanate will also vary depending upon whether it is desired to have the intermediate polyurethane terminated with free isocyanate groups or with hydroxyl groups. Thus, where it is preferred to terminate the intermediate polyurethane resin with free isocyanates for capping with an alcohol, an excess of polyisocyanate may be used. Where the intermediate polyurethane resin is to be so capped, a stoichiometric deficiency of polyisocyanate may be used.

When the polyurethane utilizes acid water-stabilizing groups, the amount of multi-functional component having at least one active hydrogen group and at least one water-stabilizing group may vary depending upon the desired acid number of the final polyurethane resin. The final polyurethane resin should have an acid number of at least about 10, and the amount of this multi-functional component comprises between about 1% and about 25% by weight of the reactants of polyurethane producing reaction mixture (polyisocyanate, polyol, multifunctional compound, and optionally other chain extenders, for example compounds having two active hydrogens but no carboxylic groups). It is preferable that the acid number be higher, because as the acid number increases, the water-dispersibility of the polyurethane resin potentially increases. Of course, the upper limit of the acid number will vary depending upon the chemical composition of the final polyurethane resin, but an acid number of about 100 is, in general, the practical limit of polyurethane resins of the present invention.

The amount of chain extender (including the reaction product of step (a) and other chain extending agents), when used to producing a polyurethane resin, varies between about 2% and 25% by weight of the reactants. The amount used will depend upon the amount of chain extension desired and the desired molecular weight of the polyurethane molecule.

After the an anionically water-solubilized polyurethane resin is synthesized, a portion of the free carboxylic acid groups is neutralized with base to form salt groups. Preferably, the base is an amino containing compound.

Tertiary amines are generally preferred over primary and secondary amines because of the tendency of the primary and secondary amines to react with aminoplast cross-linking agents. Preferred tertiary amines include tri-alkylamines, for example, trimethyl and triethylamine. Also preferred is triethanolamine. Particularly preferred is dimethylethanolamine.

The polyurethane resins of the present invention can be formulated, along with other components coating compositions which are sprayed or electrostatically deposited onto metal or plastic substrates, for example, automobile bodies. In general, a polyurethane resin formulated as described herein, is mixed with a curing agent, a pigment grind resin, water and/or organic solvents, pigments including aluminum and/or mica particles and a rheology control agent. Other agents may be included, for example, various fillers, surfactants, plasticizers, stabilizers, wetting agents, dispersing agents, defoamers, adhesion promoters and catalysts in minor amounts.

As indicated, a dispersion of the polyurethane resin is utilized as the principal or major vehicle resin. In general, the principal or major vehicle resin comprises between about 20 and 80% by weight of the total solids present in the basecoat composition.

In a curable composition according to the invention, curing is effected by a reaction of the carbamate-functional polyurethane component with a component (2) that is a compound having a plurality of functional groups that are reactive with the pendant carbamate groups on the polyurethane. Such reactive groups include active methylol or methylalkoxy groups on aminoplast crosslinking agents or on other compounds such as phenol/formaldehyde adducts, siloxane groups, and anhydride groups. Examples of curing agents include melamine formaldehyde resin (including monomeric or polymeric melamine resin and partially or fully alkylated melamine resin), urea resins (e.g., methylol ureas such as urea formaldehyde resin, alkoxy ureas such as butylated urea formaldehyde resin), polyanhydrides (e.g., polysuccinic anhydride), and polysiloxanes (e.g., trimethoxy siloxane). Aminoplast resin such as melamine formaldehyde resin or urea formaldehyde resin are especially preferred.

A solvent may optionally be utilized in a curable composition used in the practice of the present invention. Although the composition used according to the present invention may be utilized, for example, in the form of substantially solid powder, or a dispersion, it is often desirable that the composition is in a substantially liquid state, which can be accomplished with the use of a solvent. This solvent should act as a solvent with respect to both the carbamate-functional polyurethane as well as the curing agent. In general, depending on the solubility characteristics of the components, the solvent can be any organic solvent and/or water. In one preferred embodiment, the solvent is a polar organic solvent. More preferably, the solvent is a polar aliphatic solvents or polar aromatic solvents. Still more preferably, the solvent is a ketone, ester, acetate, aprotic amide, aprotic sulfoxide, or aprotic amine. Examples of useful solvents include methyl ethyl ketone, methyl isobutyl ketone, a-amyl acetate, ethylene glycol butyl ether-acetate, propylene glycol monomethyl ether acetate, xylene, N-methylpyrrolidone, or blends of aromatic hydrocarbons. In another preferred embodiment, the solvent is water or a mixture of water with small amounts of co-solvents.

The curable composition used in the practice of the invention may include a catalyst to enhance the cure reaction. For example, when aminoplast compounds, especially monomeric melamines, are used, a strong acid catalyst may be utilized to enhance the cure reaction. Such catalysts are well-known in the art and include, for example, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Strong acid catalysts are often blocked, e.g. with an amine. Other catalysts that may be useful in the composition of the invention include Lewis acids, zinc salts, and tin salts.

In a preferred embodiment of the invention, the solvent is present in the curable composition in an amount of from about 0.01 weight percent to about 99 weight percent, preferably from about 10 weight percent to about 60 weight percent, and more preferably from about 30 weight percent to about 50 weight percent.

Coating compositions can be coated on the article by any of a number of techniques well-known in the art. These include, for example, spray coating, dip coating, roll coating, curtain coating, and the like. For automotive body panels, spray coating is preferred.

Any additional agent used, for example, surfactants, fillers, stabilizers, wetting agents, dispersing agents, adhesion promoters, UV absorbers, HALS, etc. may be incorporated into the coating composition. While the agents are well-known in the prior art, the amount used must be controlled to avoid adversely affecting the coating characteristics.

The curable composition according to the invention is preferably utilized in a high-gloss coating and/or as the clearcoat of a composite color-plus-clear coating. High-gloss coatings as used herein are coatings having a 20° gloss (ASTM D523-89) or a DOI (ASTM E430-91) of at least 80. The curable composition according to the invention can also be used as the basecoat of a composite color-plus-clear coating.

When the coating composition of the invention is used as a high-gloss pigmented paint coating, the pigment may be any organic or inorganic compounds or colored materials, fillers, metallic or other inorganic flake materials such as mica or aluminum flake, and other materials of kind that the art normally names as pigments. Pigments are usually used in the composition in an amount of 1% to 100%, based on the total solid weight of components A and B (i.e., a P:B ratio of 0.1 to 1).

When the coating composition according to the invention is used as the clearcoat of a composite color-plus-clear coating, the pigmented basecoat composition may any of a number of types well-known in the art, and does not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. In one preferred embodiment of the invention, the basecoat composition also utilizes a carbamate-functional acrylic polymer. Basecoat polymers may be thermoplastic, but are are preferably crosslinkable and comprise one or more type of cross-linkable functional groups. Such groups include, for example, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Useful cross-linkable functional groups include hydroxy, epoxy, acid, anhydride, silane, and acetoacetate groups. Preferred cross-linkable functional groups include hydroxy functional groups and amino functional groups.

Basecoat polymers may be self-cross-linkable, or may require a separate cross-linking agent that is reactive with the functional groups of the polymer. When the polymer comprises hydroxy functional groups, for example, the cross-linking agent may be an aminoplast resin, isocyanate and blocked isocyanates (including isocyanurates), and acid or anhydride functional cross-linking agents.

The coating compositions described herein are preferably subjected to conditions so as to cure the coating layers. Although various methods of curing may be used, heat-curing is preferred. Generally, heat curing is effected by exposing the coated article to elevated temperatures provided primarily by radiative heat sources. Curing temperatures will vary depending on the particular blocking groups used in the cross-linking agents, however they generally range between 93° C. and 177° C. The compounds according to the present invention are reactive even at relatively low cure temperatures. Thus, in a preferred embodiment, the cure temperature is preferably between 115° C. and 150° C., and more preferably at temperatures between 115° C. and 138° C. for a blocked acid catalyzed system. For an unblocked acid catalyzed system, the cure temperature is preferably between 82° C. and 99° C. The curing time will vary depending on the particular components used, and physical parameters such as the thickness of the layers, however, typical curing times range from 15 to 60 minutes, and preferably 15–25 minutes for blocked acid catalyzed systems and 10–20 minutes for unblocked acid catalyzed systems.

The invention is further described in the following examples.

EXAMPLE 1

Preparation of polyol having at least one pendant carbamate group

A three neck round bottom flask was fitted with a cold-finger condenser, stirrer, ammonia inlet tube fitted with porous fritted glass tip and thermocouple. This apparatus was then placed in a metal container which was filled with dry ice, water, acetone and sodium chloride as a cold bath in order to control the temperature of the reaction. This reactor was loaded with hydroxyalkyl cyclic carbonate (Glycar®) with an equal molar amount of methanol. The temperature of the reaction components was dropped to 15° C. at which time ammonia gas was bubbled through the reaction until the temperature of the reaction increased to 32° C. At this time the reaction was stirred and cooled back down to 15° C. This procedure was continued until a carbonate peek was no longer seen in the infrared spectrum. This should take approximately 12 hours depending on the batch size and ammonia concentration.

After all the Glycar® was converted to the glycol carbamate the reactor apparatus was converted so that a heated vacuum strip can be performed. The vacuum strip was started at room temperature to prevent bumping or over expansion of the system. The temperature was slowly increased to 80° C. under full vacuum 28 in Hg. The vacuum strip was complete when the gas chromatograph was clean of ammonia and methanol.

EXAMPLE 2

Preparation of solventborne polyurethane polymers with pendant carbamate functional groups A three neck round bottom flask was fitted with a condenser, stirrer, nitrogen inlet tube and thermocouple. This reactor was loaded with the following:

| Ingredients | Weight |
| --- | --- |
| Polyester polyol | 2333.60 |
| Methyl Propyl ketone | 488.54 |
| Neopentyl glycol | 70.37 |
| Carbamate glycol | 141.95 |
| Isophorone diisocyanate of (IPDI) | 816.75 |
| Methyl ethyl ketone | 192.62 |
| | 4043.83 |

After all of the above ingredients were added the reaction mixture was heated to 210° F. As the reaction proceeds the reaction exotherms and the reaction temperature rose to about 225° F. After the exotherm, the batch temperature was held at 225°–230° F. for three hours where the first NCO number determination was taken. The target value was (0.26–0.28)meq NCO/gram resin. When the NCO number was in this range then addition of 143.15 grams of trimethylol propane (TMP) was added in the capping stage of the reaction. After the addition of the TMP the reaction was held for 1.5 hours and a final NCO number determination was taken. When the NCO number was determined to be nonexistent the reaction was over and the reaction was cooled to 190° F. where 813.09 grams of Exxate® 800 was added.

EXAMPLE 3
Preparation of waterborne polyurethane polymers with pendant carbamate functional groups A three neck round bottom flask was fitted with a condenser, stirrer, nitrogen inlet tube and thermocouple. This reactor was loaded with the following:

| Ingredients | weight |
| --- | --- |
| Polyester polyol | 1180.04 |
| Neopentyl glycol | 11.79 |
| Carbamate glycol | 35.58 |
| Isophorone diisocyanate of (IPDI) | 413.01 |
| Dimethylolpropionic acid | 61.41 |
| Methyl ethyl ketone | 97.40 |
| | 2046.28 |

After all of the above ingredients were added the reaction mixture was heated to 210° F. As the reaction proceeds a slight exotherm occurs an the temperature will rise to about 225° F. After the exotherm, the reaction temperature was held at (225°–230° F. for three hours where the first NCO number determination was taken. The target value was between (0.29–0.30) meq NCO/gram resin. When the NCO number was in this range then the addition of 82.96 grams of trimethylol propane (TMP) was added in the capping stage of the reaction. After the addition of the TMP the reaction was held for 1.5 hours and a final NCO number determination was taken. When the NCO number was determined to be nonexistent the reaction was over an the reaction was cooled to 190° F. where 162 grams of n-butanol was added. The reaction was further cooled to 180° F. where 162.67 grams of dimethylethanolamine (DMEA) was added and mixed for one hour to complete the salting phase of the reaction. After the hold, the temperature of the reaction was lowered to 150° F. and 1667.41 grams of deionized (DI) water were charged to the vessel. After charging the DI water, the reaction was mixed for two hours in order for complete dispersion of the resin.

EXAMPLE 4
Preparation of solventborne polyurethane polymers with pendant carbamate functional groups A three neck round bottom flask was fitted with a condenser, stirrer, nitrogen inlet tube and thermocouple. This reactor was loaded with the following:

| Ingredients | Weight |
| --- | --- |
| Polyester polyol | 1732.49 |
| Methyl propyl ketone | 362.69 |
| Neopentyl glycol | 113.14 |
| Carbamate glycol | 59.11 |
| Isophorone diisocyanate (IPDI) | 651.71 |
| Methyl ethyl ketone | 143.00 |
| Dibutyltindilaurate | .05 |
| | 3063.65 |

After all of the above ingredients were added to the reactor the reaction mixture was heated to 210° F. As the reaction proceeds a slight exotherm will be noticed an the reaction temperature will rise to about 225° F. After the exotherm, the reaction temperature was held at (225°–230° F. for three hours where the first NCO number determination was taken. The target value was (0.24–0.25)meq NCO/gram resin. When the NCO number was in this range then the addition of 95.95 grams of TMP was added which was the capping stage of the reaction. After the addition of the TMP the reaction was held for 1.5 hours and a final NCO number determination was taken. When the NCO number was determined to be nonexistent the reaction was over an the reaction was cooled to 190° F. where 840.39 grams of Exxate® 800 was added and the reaction was over.

EXAMPLE 2
Preparation of solventborne polyurethane polymers with pendant carbamate functional groups with urea groups for dispersion properties A three neck round bottom flask was fitted with a condenser, stirrer, nitrogen inlet tube and thermocouple. This reactor was loaded with the following:

| Ingredients | Weight |
| --- | --- |
| Polyester polyol | 1732.49 |
| Methyl propyl ketone | 362.69 |
| Neopentyl glycol | 113.14 |
| Carbamate glycol | 59.11 |
| Isophorone diisocyanate IPDI | 651.71 |
| Methylethyl ketone | 143.00 |
| Dibutyltin dilaurate | .05 |
| | 3063.65 |

After all of the above ingredients were added the reaction mixture was then heated to 210° F. As the reaction proceeds a slight exotherm will be noticed and the reaction temperature will rise to about 225° F. After the exotherm, the batch was held at (225°–230)° F. for three hours where the first NCO number determination was taken. The target value was (0.26–0.28)meq NCO/gram resin. When the NCO number was in this range then the reaction was cooled to 200° F. in order to get the reaction ready for the capping stage. Addition of 74.95 grams diethanolamine (DEOA) was then added in the capping stage and the reaction was held for one hour. After the one hour hold a final NCO number determination was taken. When the NCO number was determined to be nonexistent the reaction was over an the reaction was cooled to 190° F. where 840.39 grams of Exxate® 800 was added after which the batch was cooled to room temperature.

EXAMPLE 6
A clear solventborne coating formulation was prepared by adding the following ingredients in order under agitation.

After all the components were added and mixed thoroughly, the paint was filtered into a container for later use.

| Ingredients | Parts by weight |
| --- | --- |
| 1. Polyurethane resin with pendent carbamate functionality (Example 1). | 300.00 |
| 2. Melamine crosslinker Resimene ® 747. Note, other types of melamines can be interchanged with the one chosen depending on the application. | 80.00 |
| 3. Tinuvin ® 384B UVA light stabilizer. | 7.50 |
| 4. Tinuvin ® 123 N-alkoxy hindered amine | 2.40 |
| 5. Nacure ® 5225 amine-blocked acid catalysts | 3.60 |
| 6. Methylamyl ketone | 11.40 |
| 7. N-butyl alcohol/Normal butanol | 75.00 |
| 8. Exxate ® 800 high-boiling alkyl acetates of primary alcohols. | 100.00 |

EXAMPLE 7

A white waterborne basecoat coating formulation was prepared by adding the following ingredients in order under agitation. After all the components were added and mixed thoroughly, the paint was filtered into a container for later use.

| Ingredients | Parts by weight |
| --- | --- |
| 1. Clay rheology agent 3.0% in water | 12.88 |
| 2. Melamine x-linker Resimene ® x-747 | 5.80 |
| 3. Solvent Dowanol ® DPM | 1.45 |
| 4. Polyurethane resin (Example 3) with pendent carbamate functionality. | 26.43 |
| 5. Fumed silica rheology agent | 6.84 |
| 6. White pigment paste | 44.03 |
| 7. Tinuvin ® 1130 | 0.33 |
| 8. Nacure ® 2500 amine-blocked acid catalysts | 1.80 |
| 9. Dimethyl ethanol amine 20% solution in | 0.44 |
| DI water to adjust pH of system. | |
| | 100.00 |

EXAMPLE 8

A white solventborne basecoat formulation was prepared by adding the following ingredients in order under agitation. After all the components were added and mixed thoroughly, the paint was filtered into a container for later use.

| Ingredients | Parts by weight |
| --- | --- |
| 1. Melamine ® x-linker Cymel ® 327 | 12.00 |
| 2. Melamine ® x-linker Cymel ® 1158 | 4.56 |
| 3. Solvent Exxate ® 1000 | 4.78 |
| 4. Microgel rheology control agent | 16.45 |
| 5. Polyurethane polymer with pendent carbamate functional groups (see example 4). | 10.73 |
| 6. Flexible high solids acrylic hydroxyl functionality. | 6.32 |
| 7. Flow additive Coroc ® A-620-A2 | 0.16 |
| 8. Solvent Xylene | 0.15 |
| 9. Tinuvin ® 1130 | 1.08 |
| 10. White pigment paste | 37.49 |
| 11. N-butyl acetate | 4.15 |

The coating compositions of Examples 6–8 were sprayed onto test panels and cured by baking to form hard cured coatings.

The invention has been described in detail with reference to preferred embodiments thereof. It should be understood, however, that variations and modifications can be made within the spirit and scope of the invention.

What is claimed is:

1. A curable coating composition comprising:
    (1) a polyurethane that is the reaction product of a mixture comprising:
        (a) a polyol having at least one pendant carbamate group,
        (b) a polyisocyanate, and
        (c) optionally, an active hydrogen-containing capping agent, and
    (2) a curing agent having a plurality of groups that are reactive with carbamate.

2. A curable coating composition according to claim 1 wherein the curing agent is an aminoplast.

3. A curable coating composition according to claim 2 wherein the aminoplast is a melamine resin.

4. A curable coating composition according to claim 1 wherein the compound (1)(a) is the reaction product of:
    (i) a hydroxyalkyl cyclic carbonate, and
    (ii) ammonia, ammonium hydroxide, or a primary amine.

5. A curable coating composition according to claim 4 wherein component (ii) is ammonia or ammonium hydroxide.

6. A curable aqueous coating composition comprising:
    (1) a polymer comprising a polyurethane polymer backbone having attached thereto both pendant carboxyl groups and pendant carbamate groups, and
    (2) a curing agent having a plurality of groups that are reactive with carbamate.

7. A curable coating composition according to claim 1, wherein the polyurethane is the reaction product of a mixture that further comprises an active hydrogen-containing capping agent.

8. A curable coating composition according to claim 1, wherein the polyurethane is the reaction product of a mixture that further comprises a compound having a plurality of active hydrogen groups.

9. A curable coating composition according to claim 8, wherein said compound having a plurality of active hydrogen groups is a polyester polyol.

10. A curable coating composition according to claim 8, wherein said compound having a plurality of active hydrogen groups is a dihydric alcohol having a carboxyl group appended thereto.

11. A curable coating composition according to claim 8, wherein said compound having a plurality of active hydrogen groups is a polyether.

12. A curable coating composition according to claim 1, further comprising water.

13. A curable coating composition according to claim 10, further comprising water.

14. A curable coating composition according to claim 1, wherein the polyurethane is linear.

15. A curable coating composition according to claim 1, wherein the polyurethane is branched.

16. A curable coating composition according to claim 1, wherein the polyurethane has terminal hydroxyl groups.

17. A curable coating composition according to claim 1, wherein the polyurethane has at least one carbamate having the structure

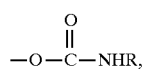

wherein R is selected from the group consisting of H, unsubstituted alkyl groups of 1–8 carbon atoms, substituted alkyl groups of 1–8 carbon atoms, and cycloalkyl groups.

18. A curable coating composition according to claim 17, wherein R is selected from the group consisting of H, unsubstituted alkyl groups of 1–4 carbon atoms, and substituted alkyl groups of 1–4 carbon atoms.

19. A curable coating composition according to claim 17, wherein R is H or methyl.

20. A curable coating composition according to claim 1, wherein the polyurethane has at least one carbamate having the structure

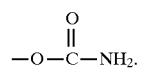

21. A curable coating composition according to claim 1, further comprising at least one pigment.

22. A curable coating composition according to claim 1, comprising 20–80% by weight of the polyurethane, based upon total solids of the coating composition.

* * * * *